United States Patent
Tsuruhara et al.

(10) Patent No.: US 7,113,082 B2
(45) Date of Patent: Sep. 26, 2006

(54) SPEEDOMETER CONTROL SYSTEM AND SPEEDOMETER CONTROL METHOD

(75) Inventors: Ryuzo Tsuruhara, Nagoya (JP); Yasumi Inoue, Kariya (JP)

(73) Assignee: Advics Co., Ltd., Aichi-Pref. (JP)

( * ) Notice: Subject to any disclaimer, the term of this patent is extended or adjusted under 35 U.S.C. 154(b) by 199 days.

(21) Appl. No.: 10/929,422

(22) Filed: Aug. 31, 2004

(65) Prior Publication Data
US 2005/0073399 A1    Apr. 7, 2005

(30) Foreign Application Priority Data
Sep. 24, 2003    (JP)    ............... 2003-331485

(51) Int. Cl.
*B60Q 1/00* (2006.01)

(52) U.S. Cl. ............. 340/441; 340/438; 73/1.37; 73/488

(58) Field of Classification Search ............. 340/441, 340/438; 73/1.37, 488, 491, 495, 498, 514.01; 701/1, 99, 110; 702/142, 145, 148
See application file for complete search history.

(56) References Cited

U.S. PATENT DOCUMENTS

| | | | |
|---|---|---|---|
| 5,969,224 A * | 10/1999 | Ebara et al. ............. | 73/1.37 |
| 6,082,195 A * | 7/2000 | Wallingford ............. | 73/514.16 |
| 6,163,742 A * | 12/2000 | Shimizu ............. | 701/1 |
| 6,384,594 B1 * | 5/2002 | Uehara et al. ............. | 324/173 |
| 6,392,535 B1 * | 5/2002 | Matsuno et al. ............. | 340/441 |
| 6,830,379 B1 * | 12/2004 | Morita et al. ............. | 384/448 |
| 6,966,223 B1 * | 11/2005 | Yamazaki et al. ............. | 73/489 |

FOREIGN PATENT DOCUMENTS

| | | |
|---|---|---|
| DE | 19521411 A1 | 12/1996 |
| JP | A-5-162560 | 6/1993 |

OTHER PUBLICATIONS

Office Action issued from German Patent Office issued on Jan. 17, 2006 for the corresponding German patent application No. 10 2004 046 254.2-54 (a copy and English translation thereof).

* cited by examiner

*Primary Examiner*—Toan N. Pham
(74) *Attorney, Agent, or Firm*—Posz Law Group, PLC

(57) ABSTRACT

In a speedometer control system having wheel speed sensors as well as a vehicle speed sensor, both a PCM and a brake ECU are used to obtain vehicle speeds. Then, a signal corresponding to a vehicle speed is obtained basically from the PCM. However, if it is impossible to properly obtain a signal corresponding to a vehicle speed from the PCM, a signal corresponding to a vehicle speed is obtained from the brake ECU. Accordingly, even in the event that a signal corresponding to the vehicle speed is not obtained from the PCM, it is possible to obtain a signal corresponding to the vehicle speed from the brake ECU, and thus to display the vehicle speed on a speedometer.

3 Claims, 2 Drawing Sheets

SPEEDOMETER CONTROL SYSTEM AND SPEEDOMETER CONTROL METHOD

CROSS REFERENCE TO RELATED APPLICATION

This application is based upon and claims the benefit of Japanese Patent Application No. 2003-331485 filed on Sep. 24, 2003, the content of which are incorporated herein by reference.

FIELD OF THE INVENTION

The invention relates to a speedometer control system and a speedometer control method used in a vehicle having wheel speed sensors and a vehicle speed sensor for obtaining a vehicle speed.

BACKGROUND OF THE INVENTION

Speedometer controllers are known that determine a vehicle speed displayed on a speedometer based on a detection signal from a vehicle speed sensor for detecting a vehicle speed based on rotation of a drive shaft transmitting engine drive force to driving wheels (Japanese Patent Application Laid-Open No. Hei. 05-162560).

In speedometer controllers of this type that use a detection signal from a vehicle speed sensor, the detection signal from the vehicle speed sensor is transmitted through a powertrain control module (hereinafter referred to as "PCM"). Hence, in the event of failure of the PCM or the like, a problem that displaying speeds is impossible arises because a signal corresponding to a vehicle speed obtained based on the detection signal from the vehicle speed sensor is not transmitted to the speedometer.

SUMMARY OF THE INVENTION

It is an object of the present invention to achieve display of vehicle speed on a speedometer even if a signal corresponding to a vehicle speed obtained based on a detection signal from a vehicle speed sensor is not provided.

According to an aspect of the present invention, if a first control portion that outputs a signal corresponding to a vehicle speed based on a detection signal from a drive-shaft rotation detection unit does not properly output a signal corresponding to a vehicle speed, a second control portion for outputting a signal corresponding to a vehicle speed based on detection signals of wheel rotation detection units outputs to a speedometer a signal corresponding to a vehicle speed obtained from detection signals corresponding to rotation of wheels. Thereby, it is possible to display the vehicle speed on the speedometer even if an irregular state occurs in the first control portion.

For example, when the first control portion, the second control portion and the speedometer are connected to each other through a communication LAN, if the first control portion does not output a signal corresponding to the vehicle speed, the second control portion outputs a signal corresponding to the vehicle speed obtained from the detection signals corresponding to the rotation of the wheels.

In this manner, the second control portion is capable of detecting, through the communication LAN, an irregular state in which the first control portion outputs no signal corresponding to a vehicle speed. Therefore, when such an irregular state is detected, the second control portion operates to output a signal corresponding to the vehicle speed that is obtained from the detection signals in accordance with the rotation of the wheels, thereby providing the above effects.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
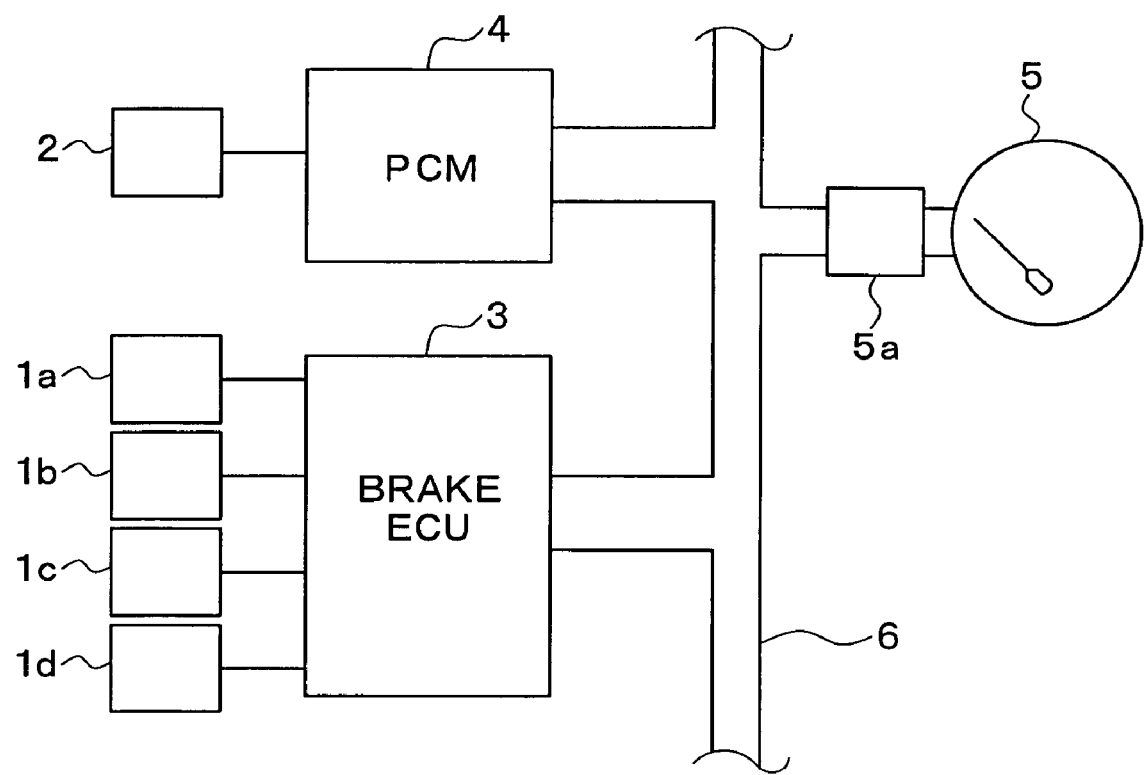
FIG. 1 is a block diagram illustrating a speedometer control system in an embodiment according to the present invention.

The present invention will be described further with reference to various embodiments in the drawings.

FIG. 1 is a block diagram illustrating a speedometer control system to which an embodiment according to the present invention is applied. The speedometer control system in the embodiment of the present invention is described with reference to FIG. 1.

The speedometer control system includes a group of various sensors 1a to 1d and 2 mounted on a vehicle, a brake ECU 3 provided for traction control and ABS control for driving an ABS actuator, a PCM 4 for controlling engine output, a speedometer 5, a speedometer ECU 5a, and a serial communication line 6 connecting between the above components.

The group of various sensors 1a to 1d and 2 includes wheel speed sensors 1a to 1d and a vehicle speed sensor 2.

The wheel speed sensors 1a to 1d correspond to a wheel rotation detection unit. The wheel speed sensors 1a to 1d are mounted respectively on wheels provided in the vehicle. Each of the wheel speed sensors 1a to 1d outputs a pulse signal serving as a wheel speed signal relating to the corresponding wheel. Each of the wheel speed signals is used to perform calculations of respective wheel speeds, a vehicle speed, a slip rate and the like.

The vehicle speed sensor 2 corresponds to a drive-shaft rotation detection unit. The vehicle speed sensor 2 is located on a drive shaft connected to the driving wheels, and outputs a detection signal corresponding to rotation of the drive shaft, in other words, a detection signal corresponding to a vehicle speed. The PCM 4 receives the detection signal from the vehicle speed sensor 2.

The brake ECU 3, which corresponds to a second control portion for performing brake force control, performs brake control in accordance with an operation amount of a brake pedal, not shown in FIG. 1. The brake ECU 3 outputs a brake control signal to the ABS actuator, which, for example, applies a control voltage to a solenoid for driving an electromagnetic valve and a motor which are provided in the ABS actuator. Accordingly, a brake fluid pressure to be generated in a wheel cylinder (W/C) is controlled for control of a brake force to be generated in each wheel. More specifically, the brake ECU 3 receives wheel speed signals from the wheel speed sensors 1a to 1d, and then calculates wheel speeds and a vehicle speed based on the received wheel speed signals. Then, based on a slip rate obtained from the calculation results, the brake ECU 3 detects an acceleration slip of the wheel and locking tendency and outputs a brake control signal to the ABS actuator in order to perform the traction control for inhibiting the acceleration slip or the ABS control for inhibiting the locking tendency.

The PCM 4, which corresponds to a first control portion for performing power adjustment, performs an engine control in accordance with an operation amount of an accelerator pedal, not shown in FIG. 1. The PCM 4 outputs an engine control signal indicating a power command value, and the engine control is performed based on the engine control signal. The PDM 4 also performs various calculations including a vehicle speed calculation based on the detection signal from the vehicle speed sensor 2, other control signals and the like, and the engine control signal is modified based on the calculation results. For example, basically, the PCM 4 determines an engine output based on the operation amount of the accelerator pedal, and then generates an engine control signal indicating the determined engine output. However, for example, while performing the traction control, the PCM 4 calculates to decrease the engine output and then outputs an engine control signal in accordance with the calculation result. Then, the engine torque, the engine speed and the like are modified based on the engine control signal for control of a reduction in the engine output.

The speedometer 5 is provided in an indicator device mounted on an instrument panel for displaying the vehicle speed. The speedometer 5 is driven based on a control signal from the speedometer ECU 5a.

The speedometer ECU 5a corresponds to a speedometer control portion. Basically, after the PCM 4 obtains the vehicle speed in accordance with the detection signal from the vehicle speed sensor 2, the PCM 4 transmits a signal indicating the obtained vehicle speed to the speedometer ECU 5a. Further, because the brake ECU 3 has calculated the vehicle speed in accordance with the detection signals from the wheel speed sensors 1a to 1d, the brake ECU 3 transmits a signal indicating the calculated vehicle speed to the speedometer ECU 5a. Thus, if an irregular state occurs in the PCM 4, the speedometer ECU 5a outputs to the speedometer 5 a signal indicating the vehicle speed received from the brake ECU 3.

The serial communication line 6, which corresponds to a communication LAN, connects between the brake ECU 3, the PCM 4, the speedometer ECU 5a, other ECUs mounted on the vehicle (not shown in FIG. 1), and the like, which means that it is a communication line among the elements. Through the serial communication line 6, the brake ECU 3, PCM 4, speedometer ECU 5a and the like make serial communication with one another to make mutual checks whether or not they are functioning in a regular state. Further, the speedometer ECU 5a receives the signals indicating the vehicle speeds through the serial communication line 6 from the brake ECU 3 and the PCM 4.

Next, processing performed by the speedometer control system with the configuration above is described with reference to the flowchart illustrating a speedometer control routine shown in FIG. 2.

Figure 2:
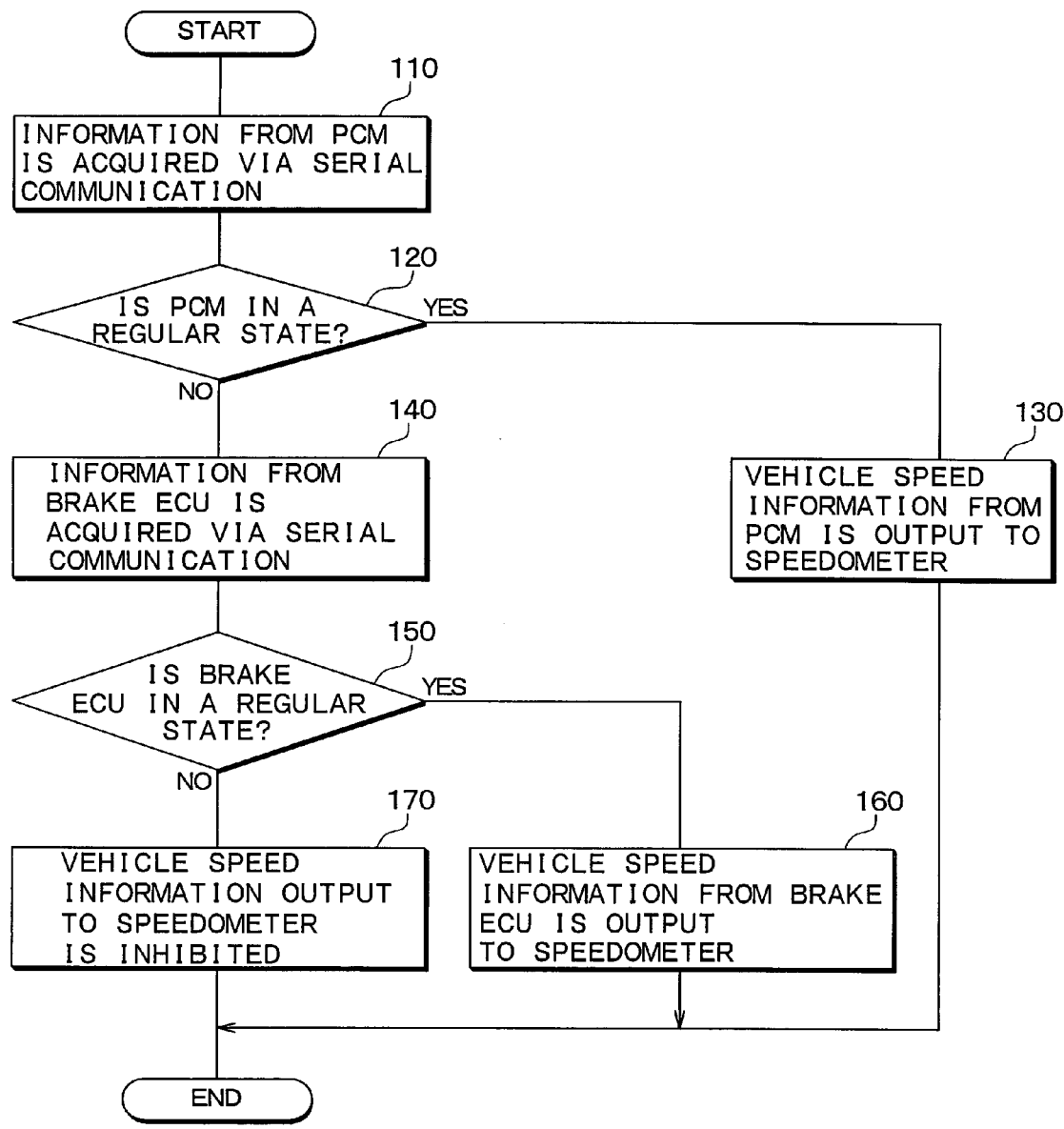
FIG. 2 is a flowchart of a speedometer control routine performed by the speedometer control system shown in FIG. 1.

The speedometer control routine shown in FIG. 2 is performed by the speedometer ECU 5a at the same time as when an ignition switch (not shown) that is provided inside a passenger compartment is turned on. The processing is performed based on signals received from the brake ECU 3 and the PCM 4 through the serial communication line 6.

First, at 110, information from the PCM 4 is acquired by means of serial communication. That is, on receiving the signals output by the PCM 4, the vehicle speed information, in other words, a signal corresponding to the vehicle speed, is obtained from among various information output from the PCM 4. Then, the routine proceeds to the processing at 120 where it is determined whether or not the PDM 4 is outputting signals corresponding to vehicle speeds in a regular state. For example, if, at 110, the signal corresponding to the vehicle speed is not obtained from the PCM 4, or alternatively if the signal corresponding to the vehicle speed has the likelihood of being incorrect because of failure of the PCM 4, a negative determination is made here.

Then, if an affirmative determination is made at 120, the PCM 4 is assumed to be outputting the signals corresponding to vehicle speeds in the regular state and the routine proceeds to the processing at 130 where the signal corresponding to the vehicle speed received from the PCM 4 is output to the speedometer 5 as it is. Thus, the speedometer 5 displays the vehicle speed corresponding to the vehicle speed information output from the PCM 4.

On the other hand, if a negative determination is made at 120, the routine proceeds to the processing at 140 where information from the brake ECU 3 is obtained through serial communication. More specifically, on receiving signals from the brake ECU 3, a signal corresponding to a vehicle speed is acquired from among various signals from the brake ECU 3. Then the routine proceeds to the processing at 150 where it is determined whether or not the brake ECU 3 is outputting signals corresponding to vehicle speed in the regular state. For example, if, at 140, a signal corresponding to the vehicle speed is not obtained from the brake ECU 3, or alternatively the signal corresponding to the vehicle speed has the likelihood of being incorrect because of failure of the brake ECU 3, a negative determination is made at 150.

Then, if an affirmative determination is made at 150, the brake ECU 3 is assumed to be outputting the signals corresponding to the vehicle speed in the regular state, and the routine proceeds to the processing at 160 where the signal corresponding to the vehicle speed received from the brake ECU 3 is output as it is to the speedometer 5. Thus, the speedometer 5 displays the vehicle speed according to the vehicle speed information output from the brake ECU 3.

Otherwise, if a negative determination is made at 150, the routine proceeds to the processing at 170. In this case, neither the brake ECU 3 nor the PCM 4 is assumed to be outputting any signal corresponding to the correct vehicle speed and, as a processing for inhibiting vehicle speed output, the outputting of signals to the speedometer 5 is stopped.

As described hitherto, in the speedometer control system illustrated in the embodiment, because the wheel speed sensors 1a to 1d as well as the vehicle speed sensor 2 are provided, it is possible to use both the PCM 4 and the brake ECU 3 to obtain the vehicle speed. Then, a signal corresponding to the vehicle speed is obtained basically from the PCM 4. However, if it is impossible to properly obtain a signal corresponding to the vehicle speed from the PCM 4, a signal corresponding to the vehicle speed is obtained from the brake ECU 3.

Accordingly, even in the event that a signal corresponding to a vehicle speed is not obtained from the PCM 4, the speedometer control system is capable of obtaining a signal corresponding to a vehicle speed from the brake ECU 3. Thus, it becomes possible to display the vehicle speed on the speedometer 5.

Further, in the event that the operations of both the PCM 4 and the brake ECU 3 are not in the regular state, the speedometer ECU 5a is inhibited to output a signal corresponding to the vehicle speed to the speedometer 5. Accordingly, when both the PCM 4 and the brake ECU 3 do not operate in the regular state, vehicle speeds are not displayed on the speedometer 5. Hence, a vehicle operator is able to recognize the failure of the PCM 4 and the brake ECU 3.

While the above description is of the preferred embodiments of the present invention, it should be appreciated that the invention may be modified, altered, or varied without deviating from the scope and fair meaning of the following claims.

What is claimed is:

1. A speedometer control system, including: a drive-shaft rotation detection unit for outputting a detection signal corresponding to rotation of a drive shaft connected to driving wheels; a first control portion for outputting a signal corresponding to a vehicle speed based on the detection signal of the drive-shaft rotation detection unit; wheel rotation detection units for outputting detection signals corresponding to the rotations of respective wheels mounted on a vehicle; a second control portion for outputting a signal corresponding to a vehicle speed based on the detection signals of the wheel rotation detection units; a speedometer for displaying vehicle speeds; and a speedometer control portion for receiving the signals corresponding to the vehicle speed from the first control portion and the second control portion, and outputting the signals to the speedometer, characterized in that, while the first control portion is outputting the signals corresponding to the vehicle speed in a normal state, the speedometer control portion outputs to the speedometer the signal corresponding to the vehicle speed output from the first control portion, the speedometer displaying the vehicle speed based on the signal corresponding to the vehicle speed output from the first control portion, and that when the first control portion does not output the signal corresponding to the vehicle speed in the normal state, the speedometer control portion outputs to the speedometer the signal corresponding to the vehicle speed output from the second control portion, the speedometer displaying the vehicle speed based on the signal corresponding to the vehicle speed output from the second control portion.

2. The speedometer control system according to claim 1, wherein the first control portion, the second control portion and the speedometer are connected to each other by means of a communication LAN, characterized in that when the first control portion outputs no signal corresponding to the vehicle speed, the second control portion outputs the signal corresponding to the vehicle speed obtained from the detection signals corresponding to the rotation of the wheels.

3. A speedometer control method for displaying a vehicle speed on a speedometer using an output of a signal corresponding to the vehicle speed from a first control portion based on a detection signal from a drive-shaft rotation detection unit which outputs a detection signal corresponding to rotation of a drive shaft connected to driving wheels, the method characterized by comprising:

outputting a detection signal to a second control portion from wheel rotation detection units that output the detection signal corresponding to rotation of each of wheels mounted on a vehicle;

displaying the vehicle speed on the speedometer corresponding to the signal corresponding to the vehicle speed output from the first control portion when the first control portion outputs the signal corresponding to the vehicle speed in a normal state; and displaying a vehicle speed on the speedometer by outputting to the speedometer from the second control portion a signal corresponding to the vehicle speed obtained from the detection signal corresponding to the rotation of each of the wheels by the second control portion, when the first control portion does not output the signal corresponding to the vehicle speed in the normal state.

* * * * *